(12) United States Patent
Povolny et al.

(10) Patent No.: US 9,335,397 B2
(45) Date of Patent: May 10, 2016

(54) METHOD FOR RADIO COMMUNICATION BETWEEN A RADIO BEACON AND AN ONBOARD UNIT, AND RADIO BEACON AND ONBOARD UNIT THEREFOR

(71) Applicant: Kapsch TrafficCom AG, Vienna (AT)

(72) Inventors: Robert Povolny, Vienna (AT); Refi-Tugrul Guner, Baden (AT)

(73) Assignee: Kapsch Trafficcom AG (AT)

( * ) Notice: Subject to any disclaimer, the term of this patent is extended or adjusted under 35 U.S.C. 154(b) by 497 days.

(21) Appl. No.: 13/782,016

(22) Filed: Mar. 1, 2013

(65) Prior Publication Data

US 2013/0234892 A1 Sep. 12, 2013

(30) Foreign Application Priority Data

Mar. 7, 2012 (EP) ..................................... 12158341

(51) Int. Cl.
| | |
|---|---|
| *G01S 1/08* | (2006.01) |
| *G01S 1/02* | (2010.01) |
| *G07B 15/06* | (2011.01) |
| *G08G 1/056* | (2006.01) |
| *G08G 1/0967* | (2006.01) |
| *G07C 5/00* | (2006.01) |
| *G07C 5/08* | (2006.01) |

(52) U.S. Cl.
CPC ................. *G01S 1/02* (2013.01); *G07B 15/063* (2013.01); *G08G 1/056* (2013.01); *G08G 1/096716* (2013.01); *G08G 1/096741* (2013.01); *G08G 1/096783* (2013.01); *G07C 5/008* (2013.01); *G07C 5/085* (2013.01)

(58) Field of Classification Search
CPC ....... G01S 1/08; G01S 1/02; G08G 1/096783; G08G 1/096716; G08G 1/096741; G07C 5/008; G07C 5/085
USPC .......................................................... 342/386
See application file for complete search history.

(56) References Cited

U.S. PATENT DOCUMENTS

| | | | |
|---|---|---|---|
| 6,240,361 B1* | 5/2001 | Ise et al. ......................... 701/431 |
| 8,059,012 B2* | 11/2011 | Bai et al. ........................ 340/902 |
| 2005/0099321 A1 | 5/2005 | Pearce |
| 2006/0226968 A1 | 10/2006 | Tengler et al. |
| 2008/0084272 A1* | 4/2008 | Modiano ........................ 340/5.2 |
| 2011/0054716 A1* | 3/2011 | Stahlin et al. ..................... 701/1 |
| 2011/0205943 A1* | 8/2011 | Grimm et al. ................. 370/310 |

(Continued)

FOREIGN PATENT DOCUMENTS

| | | |
|---|---|---|
| DE | 102005018557 A1 | 10/2006 |
| EP | 2001001 A2 | 12/2008 |

OTHER PUBLICATIONS

Extended European Search Report for EP App. No. 12158341.3 dated May 7, 2012.

(Continued)

*Primary Examiner* — Harry Liu
(74) *Attorney, Agent, or Firm* — Fiala & Weaver P.L.L.C.

(57) ABSTRACT

Selective radio communication between a radio beacon and an onboard unit of a vehicle passing the radio beacon comprising: in the onboard unit determining the current heading of the onboard unit and transmitting information thereon to the radio beacon; in the radio beacon checking whether the heading indicated in the heading information is within predetermined boundaries, and if so, carrying out a radio communication with the onboard unit.

22 Claims, 4 Drawing Sheets

(56) References Cited

U.S. PATENT DOCUMENTS

| | | | |
|---|---|---|---|
| 2011/0307121 A1* | 12/2011 | Matsuoka | 701/1 |
| 2012/0068861 A1* | 3/2012 | Hanisch et al. | 340/905 |
| 2014/0309903 A1* | 10/2014 | Otake | 701/70 |

OTHER PUBLICATIONS

Official Action for EP App. No. 12158341.3 dated Aug. 13, 2012.

* cited by examiner

METHOD FOR RADIO COMMUNICATION BETWEEN A RADIO BEACON AND AN ONBOARD UNIT, AND RADIO BEACON AND ONBOARD UNIT THEREFOR

CROSS REFERENCE TO RELATED APPLICATIONS

The present application claims the priority of the European patent application no. 12158341.3 filed Mar. 7, 2012, which is hereby incorporated by reference herein.

FIELD OF THE INVENTION

The present disclosure relates to a method for selective radio communication between a radio beacon and an onboard unit of a vehicle passing the radio beacon. The disclosure further relates to one or more apparatuses such as a radio beacon and an onboard unit for carrying out this method.

BACKGROUND

Radio beacons (roadside units, RSUs) and onboard units (OBUs) of this type are used in infrastructure-hound road toll and communication systems. These systems are based on a plurality of geographically distributed stationary radio beacons, which communicate via short-range radio with onboard units of passing vehicles so as to localize them to their limited beacon radio coverage range. This allows location usages by the vehicles to be subjected to tolls, for example, or to supply these with location-specific information. To this end, it is frequently important to be able to associate the radio communication between a radio beacon and an onboard unit located in the vicinity thereof with a particular vehicle, for example so as to identify the communicating vehicle in a camera image of the radio beacon during high traffic density.

At present, radio beacons having a particularly small, strongly directional radio coverage range are generally used for this purpose, for example those according to the dedicated short range communication (DSRC) standard, and are thus specifically associated with each individual lane of multi-lane road. When radio beacons that have a larger radio coverage range, for example according to the wireless access in a vehicle environment (WAVE) standard, are used, additional lane-specific identification devices such as lane antennas, radio direction finding receivers or the like are required to associate the radio communication to vehicles. Both variants require the lane-specific installation of infrastructure on the road, which is accomplished by mounting installations that span the road ("gantries") or by masts containing mounting booms that are provided on the road. Such mounting installations, masts and booms are not only extremely expensive to set up, but because of the massive design thereof also take up a lot of space and are not attractive, especially in residential areas and natural landscapes.

SUMMARY

Described herein are various embodiments of methods and devices for selective radio communication between radio beacons and onboard units. Some embodiments include a method of the type mentioned above, comprising: in the onboard unit: determining a current heading of the onboard unit and transmitting heading information indicating the current heading to the radio beacon; in the radio beacon: checking whether the heading indicated in the heading information is within predetermined boundaries, and if so, carrying out a radio communication with the onboard unit. In other words: The radio beacon receives the heading information and carries out a radio communication with the onboard unit based upon the heading indicated in the heading information being within predetermined boundaries; or, the radio beacon receives the heading information and determines that the heading indicated in the heading information is within predetermined boundaries, and responsively carries out a radio communication with the onboard unit.

Some embodiments described herein include evaluating the direction of movement ("heading") of an onboard unit moving about in the radio coverage range of a radio beacon, so as to selectively carry out radio communication only with such onboard units that move about in a particular direction. This allows radio communications with onboard units in lanes in different driving directions to be distinguished from each other, without requiring expensive, massive, space-consuming and landscape-changing installation structures. In addition, onboard units that move about in an undesired directional range, for example vehicles in transverse traffic, can be ignored and suppressed.

As a result, selective radio communication between a radio beacon and onboard units of the flowing traffic is achieved in a simple, cost-effective and space-saving manner, whereby it is possible, for example, to also employ radio beacons having larger radio coverage ranges without the use of gantries, which can be arranged hidden so as to preserve the landscape.

The onboard unit can periodically transmit, or emit, the heading information thereof, so that radio beacons along the way can receive the same. For example, the onboard unit can use so-called 'common awareness messages' (CAMs) according to the ETSI ITS-G5 standard for this purpose, which are emitted every 100 milliseconds by the onboard unit to neighboring motorists and radio beacons.

As an alternative, the onboard unit transmits the heading information thereof only when it detects a radio beacon in the vicinity, so as to attain maximum accuracy and efficiency.

A radio beacon can be detected in the vicinity of the onboard unit in any manner that is known from the prior art, for example by means of optical sensors of the onboard unit, which detect optical markers or the appearance of a radio beacon; by detecting when known locations of radio beacons are reached, when the onboard unit can determine its own position, for example by means of satellite navigation, or the like. In some embodiments the radio beacon periodically emits communication requests, and the aforementioned detection of the radio beacon is achieved by receiving a communication request in the onboard unit, whereby no additional devices of the onboard unit, beyond the existing communication devices, are required.

The aforementioned predetermined boundaries may be one or more angular ranges of geographical directions. This allows tolerance ranges to be created for permissible onboard unit movements in particular geographical directions, and selective radio communication can be associated therewith.

In further embodiments an omnidirectional antenna can be used for emitting the communication request and carrying out the radio communication in the radio beacon. The methods described herein are thus particularly suited for WAVE radio beacons having non-directional, large-area radio coverage ranges, which parasitically capture multiple lane directions, intersecting roads and the like, so as to selectively carry out radio communication with onboard units in particular road directions.

According to a further embodiment, the onboard unit can additionally determine the current position thereof and transmit this to the radio beacon, and the radio beacon can additionally check whether the position thus received is within predetermined boundaries, and, in some embodiments, the radio communication with the onboard unit can be carried out only if this is the case. As an alternative, the radio beacon can determine the current position of the onboard unit and can additionally check whether the position thus determined is within predetermined boundaries, and the radio communication with the onboard unit can be carried out only if this is the case. This also allows onboard units that move in the same direction, for example in different lanes in the same driving direction, to be distinguished from each other.

The onboard unit may be configured to send a unique radio identifier together with the heading information, the identifier being used to address the onboard unit in the radio communication. This is advantageous with higher traffic densities, when multiple onboard units simultaneously move about in the radio coverage range of a radio beacon.

The heading, and in some embodiments, the position of the onboard unit, can be determined in a wide variety of ways known from the prior art. For example, the onboard unit could contain an electronic compass, be mounted on the vehicle in a predetermined location relative to the wheels of the vehicles and receive a speed reading from the speedometer of the vehicle, so that the heading of the onboard unit can be determined based on the compass direction at a speed that is greater than zero. The determination is preferably carried out using a satellite navigation receiver that is arranged in the onboard unit and can calculate movement vectors ("headings"), and thus the respective current direction of movement, from consecutive 'position fixes'.

The methods of the various embodiments described herein are suitable for all types of short-range radio communication between radio beacons and onboard units, for example according to the DSRC standard mentioned above. The use is particularly favorable for radio communication according to the WAVE standard, which was developed for network radio communication.

In various embodiments, the radio beacon and the onboard unit are part of a road toll system, and the radio communication is used to impose tolls for road usage by the onboard unit.

In a further embodiment, a radio beacon comprises a transceiver for radio communication with onboard units of passing vehicles, which is configured to receive information from an onboard unit about the current heading thereof via radio and to check whether the heading is within predetermined boundaries, and to carry out the radio communication with the onboard unit only if this is the case. In other words: The radio beacon receives the heading information and carries out a radio communication with the onboard unit based upon the heading indicated in the heading information being within predetermined boundaries; or, the radio beacon receives the heading information and determines that the heading indicated in the heading information is within predetermined boundaries, and responsively carries out a radio communication with the onboard unit.

In a further embodiment, an onboard unit for mounting on a vehicle comprises a transceiver for radio communication with radio beacons along the way, and further comprises a processor and a device for determining the heading thereof, which is configured to determine the current heading when a radio beacon is detected in the vicinity thereof, and to transmit heading information thereon to the radio beacon.

Reference is made to the above descriptions of the method with respect to additional features and advantages of the radio beacon and onboard unit according to the various embodiments described herein.

BRIEF DESCRIPTION OF THE FIGURES

The embodiments will be described in more detail hereafter based on various embodiments, which are shown in the accompanying drawings. In the drawings.

DETAILED DESCRIPTION

Figure 1:
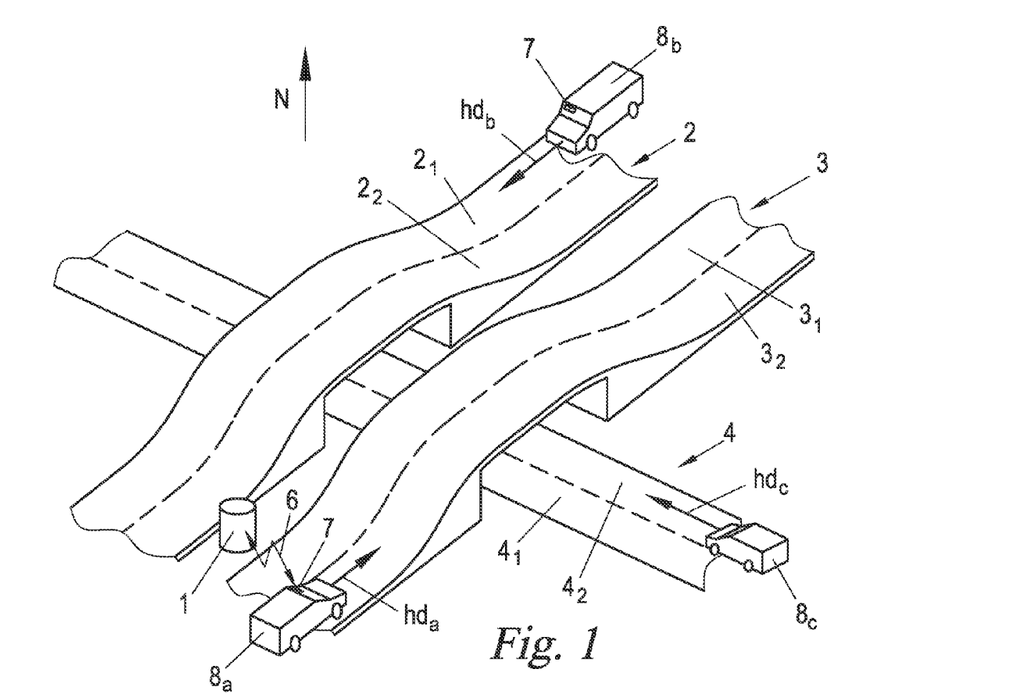
FIG. 1 shows a schematic perspective view of an exemplary radio communication situation of the method and devices according to an embodiment.
Figure 3:
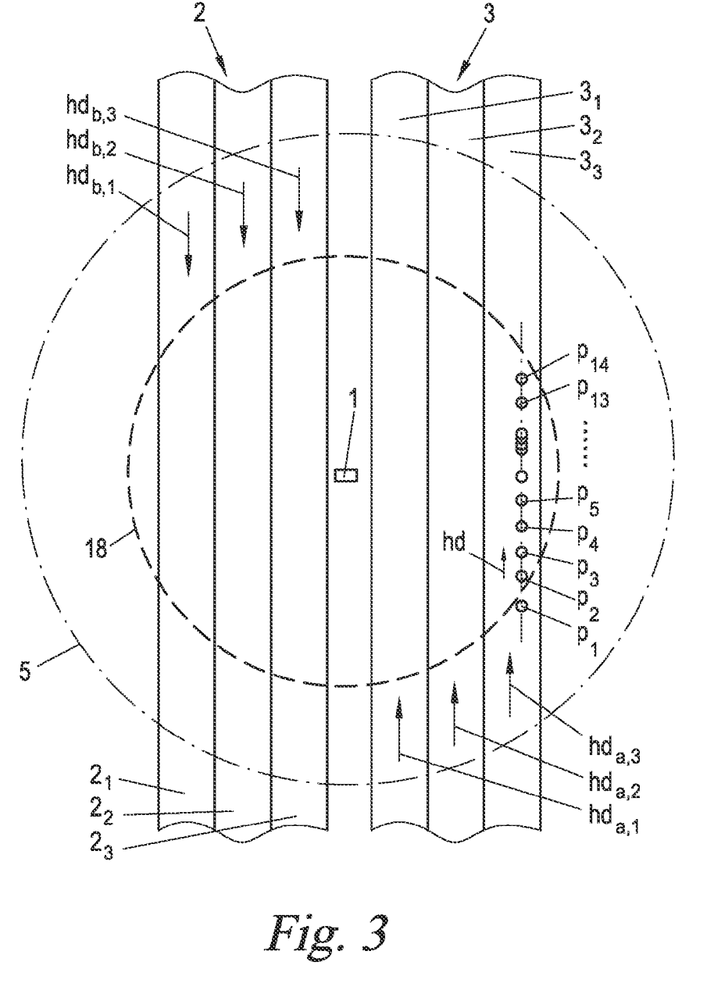
FIG. 3 is a schematic top view of another radio communication embodiment of the method and devices.

FIGS. 1 and 3 show a radio beacon 1, which is located between two roads 2, 3 containing various lanes $2_1$, $2_2$, $2_3$, $3_1$, $3_2$, $3_3$. A cross-road 4, which runs approximately at a right angle thereto and contains lanes $4_1$, $4_2$, is shown by way of example in FIG. 1.

The radio beacon 1 comprises one (or more) transceiver having a radio coverage range 5, in which the beacon can maintain radio communication 6 with onboard units (OBUs) 7 carried by vehicles $8_a$, $8_b$, $8_c$ passing the radio beacon 1. The radio coverage range 5 can be distributed non-directionally around the radio beacon 1, for example if the same comprises an omnidirectional antenna. As an alternative, the antenna characteristics of the radio beacon 1 may be directional, for example limited to one or more roads 2 to 4 or the lanes thereof. The method described hereafter concerns the situation in which the radio coverage range 5 can be traversed by vehicles 8 (e.g., $8_a$, $8_b$, $8_c$) at various directions of movement ("headings") $hd_a$, $hd_b$, $hd_c$. The headings $hd_a$, $hd_b$, $hd_c$ of the example vehicles are plotted in FIG. 2 for illustration purposes on a windrose (compass rose) 9 in relation to the geographical directions that are north (0°), east (90°), south (180°) and west (270°). As used herein, the terms "heading" and "heading information" both refer to data that is representative of a vehicle's direction of movement.

The method described hereafter, part of which takes place in the radio beacon 1 and part of which takes place in the onboard units 7, is used to carry out radio communication 6 selectively with onboard units 7 having certain headings $hd_a$, $hd_b$, $hd_c$. For example, this allows the radio beacon 1 to communicate only with onboard units 7 that belong to vehicles $8_a$ on the road 3, or to vehicles $8_b$ on the road 2, and, for example, under no circumstances with onboard units 7 that are carried by vehicles $8_c$ on the cross-road 4. Specially equipped onboard units 7 are used for this purpose, the design of which is shown schematically in FIG. 4.

Figure 4:
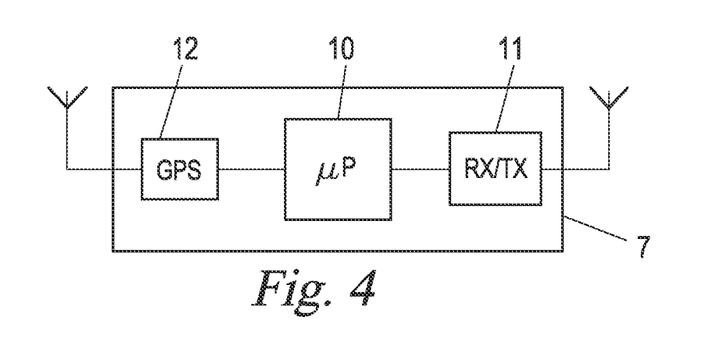
FIG. 4 is a block diagram of an onboard unit according to an embodiment.

According to FIG. 4, the onboard units 7 comprise a central processor 10, a transceiver 11 for radio communication with the radio beacon 1, and a device 12 for determining the heading $hd_a$, $hd_b$, $hd_c$ ("hd" in general) thereof in a reference system, such as the windrose 9. In some embodiments the device 12 can additionally be used to determine the respective current position $p_i$ of the onboard unit 7 in a reference system, for example a global coordinate system or the radio coverage range 5.

Note that processor 10 further comprises a computer-readable storage medium for storing instructions thereon, that when executed cause the device to become a specially programmed device for carrying out the functions set forth herein. The processor 10 may include one or more processors that may be co-located with each other or may be located in different parts of the on board unity 7. The storage medium may include one or more computer-readable storage devices, including RAM, DRAM, or ROM memory devices, primary memory or secondary memory, and removable storage media.

For example, the device 12 is a satellite navigation receiver for a global satellite navigation system (GNSS) such as GPS, GLONASS, Galileo or the like, and determines current positions ("position fixes") $p_i$, $p_{i+1}$, $p_{i+2}$ and the like continually, or periodically, or only when prompted by the processor 10. Based on positions $p_i$, $p_{i+1}$ determined at two consecutive times $t_i$, $t_{i+1}$, the device 12 can then determine a respective current movement vector as the heading hd of the onboard unit 7 in the reference system 9 in the known manner by subtraction $p_{i+1}-p_i$.

In an alternative embodiment, the device 12 could contain an electronic compass (magnetic field sensor), for example, and additionally receive a speed reading from a speed indicator (speedometer) of the vehicle 8. Having knowledge of a predetermined installation location of the onboard unit 7 on the vehicle 8, and more particularly relative to the rolling direction of the wheels of the vehicle 8, it is then possible, at a speed that is different from zero, to determine the compass direction read in the wheel rolling direction as the heading hd of the onboard unit 7 in the reference system 9.

For example, if the onboard unit 7 is installed by the user in the vehicle 8, such as by gluing it to the windshield, such a compass-based device 12 could be "oriented" using a simple calibration trip, for example by the user driving north and pushing a corresponding calibration button of the onboard unit 7, so as to always determine a correct heading hd in the reference system 9, even with differing installation locations of the onboard unit 7 relative to the rolling direction of the wheels of the vehicle 8.

Figure 5:
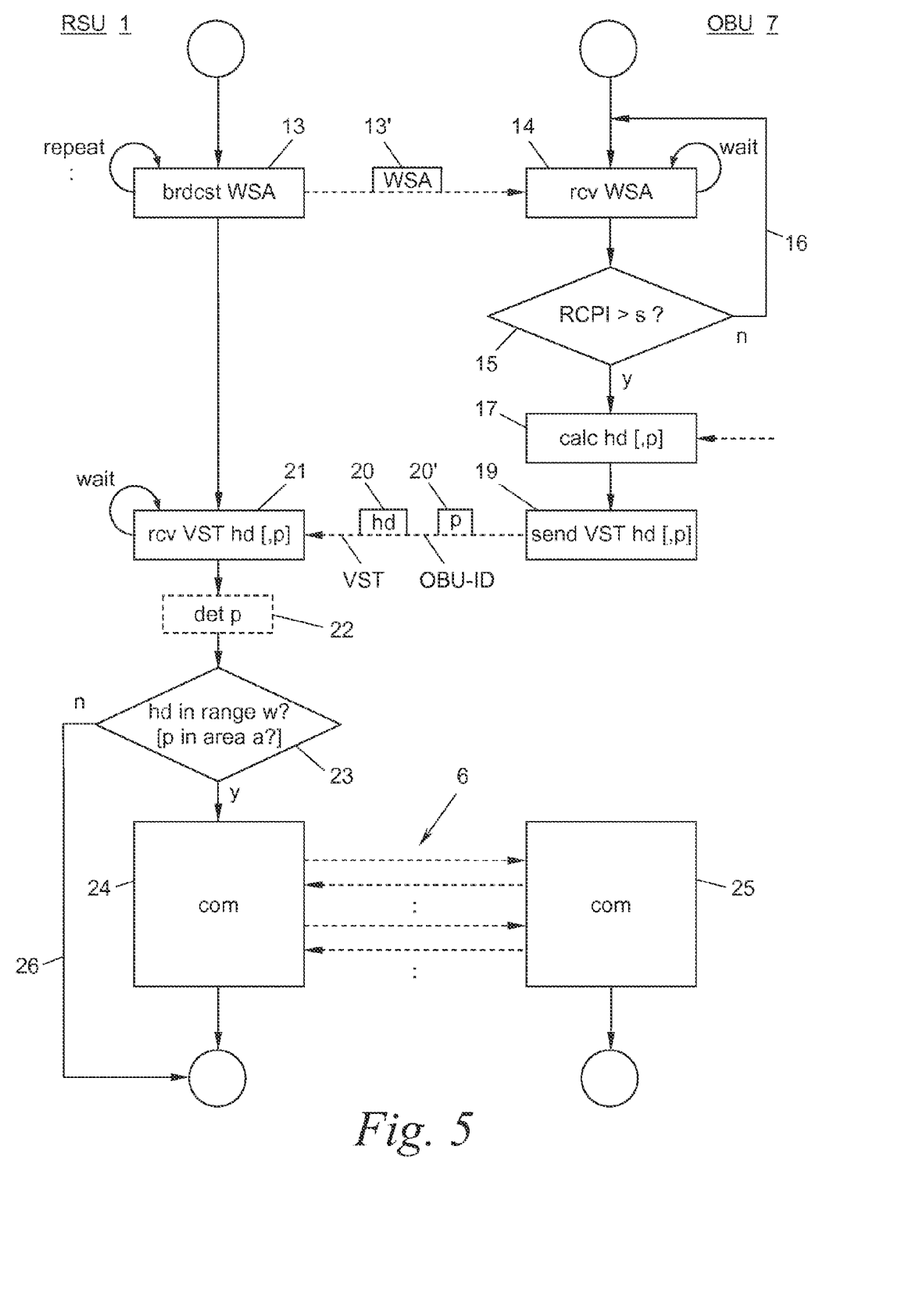
FIG. 5 is a flow chart of a first embodiment of a method.

The heading hd thus determined is thereafter transmitted in a preliminary phase of radio communication 6 by the onboard unit 7 to the radio beacon 1, which independently of the heading hd decides whether or not the radio communication 6 is carried out. FIG. 5 shows the flow of this embodiment of a method in detail. The left half of FIG. 5 shows the part of the method that takes place in the radio beacon 1, and the right half shows the part of the method that takes place in the onboard unit 7. FIG. 3 shows several exemplary positions $p_i$ ($p_1$, $p_2$, ... $p_{14}$), which the onboard unit 7 assumes over the course of the method of FIG. 5 when passing through the radio coverage range 5 of the radio beacon 1.

FIG. 5 describes one method by way of example based on messages according to the WAVE standard IEEE 802.11p exchanged between the radio beacon 1 and the onboard unit 7. However, the described method is also suitable for all other types of message and radio communication standards, for example other WAVE, ITS-G5 or CEN-DSRC standards, radio frequency identification (RFID), Bluetooth®, wireless local area network (WLAN) or comparable standards.

According to FIG. 5, in a first step 13 (or one taking place permanently in the background) the radio beacon 1 transmits at least one communication request 13' (some embodiments transmit multiple requests, which may be repeated periodically) in the radio coverage range 5. The communication request 13' is a so-called "WAVE service announcement" (WSA) according to the WAVE standard, for example. The communication request 13' is received by an onboard unit 7 that enters the radio coverage range 5, as shown with respect to step 14, and that was ready to receive this request, for example.

The processor 10 and the transceiver 11 of the onboard unit 7 can be programmed using instructions stored in a computer-readable medium so that these respond only to communication requests 13', the received signal strength of which (in the WAVE standard: the "received channel power indicator" measure, RCPI) exceeds a predetermined threshold value s, as shown in decision step 15. If a communication request 13' that is received when the radio coverage range 5 is entered does not exceed the threshold value s (branch "n"), another branching back to step 14 "Waiting for receipt and receive" takes place (loop 16). As soon as a communication request 13' has been received, the received signal strength RCPI of which exceeds the threshold value s, the process moves on to step 17 (branch "y").

FIG. 3 shows by way of example a first position $p_1$, which the onboard unit 7 assumes when passing through loop 16, and a second position $p_2$, at which the unit has entered a range 18 of exceeding the threshold value RCPI>s and the process proceeds to step 17.

Instead of the onboard unit 7 detecting a radio beacon 1 based on a communication request 13' emitted thereby, the onboard unit 7 could, in one embodiment, also detect the appearance of a radio beacon 1 in the vicinity, which is to say the entering of the near range 5 or range 18 of exceeding the threshold value, in another manner, for example by optically detecting the appearance of or by optically marking the radio beacon 1 by means of a camera of the onboard unit 7; by comparing the current position $p_i$ thereof (see below) to a list of predetermined or known locations of radio beacons 1 and so forth. In some embodiments, the radio beacon 1 could emit the communication request 13' thereof only in response to "reverse" communication requests (not shown) from the onboard unit 7, which the same emits periodically.

In step 17, the onboard unit 7 determines the current heading hd thereof using the device 12, for example by way of "position fix tracking" between two positions $p_2$ and $p_3$ following each other at short intervals. For example, the heading information, or heading data hd is indicated in the reference system of the windrose 9 as a geographical direction in degrees, for example 45° for northeast. In some embodiments in addition to the heading hd, in step 17 the current position $p_i$, p in general, which here is one of the positions $p_2$ or $p_3$, for example, can be determined. Step 17 can also take place continuously or periodically in the background in the onboard unit 7.

Thereafter, in step 19 the onboard unit 7 transmits the heading hd thus determined in form of heading information 20 and—optionally—the position p thus determined in form of position information 20', via the transceiver 11 thereof to the radio beacon 1, which awaited this in step 21. For this purpose, the onboard unit 7 is at position $p_4$, for example (FIG. 3).

The transmission of the heading information 20, and of the position information 20' (in some embodiments), in step 19 can, for example, take place in form of a vehicle service table (VST) message of the WAVE standard, or directly following such a VST message, or in another standard-compliant message format, for example in form of a "MSG_ProbeVehicleData" message of the IEEE 802.11p standard. As a result, no modification of the transmission standard to the radio interface between the radio beacon 1 and the onboard unit 7 is required.

Together with the VST message and/or with the heading information 20 and/or with all other data packets, the onboard unit 7 preferably also transmits an identifier OBU-ID identifying the same, which the radio beacon 1 can use to distinguish a plurality of onboard units 7 and radio communication 6 maintained therewith from each other. Instead of the onboard unit 7 transmitting the current position p thereof in step 19, in an alternative embodiment the radio beacon 1 can determine the position p of the onboard unit 7, for example by way of radio direction finding or conventional position determination devices such as light barriers, scanners, cameras or the like.

Figure 2:
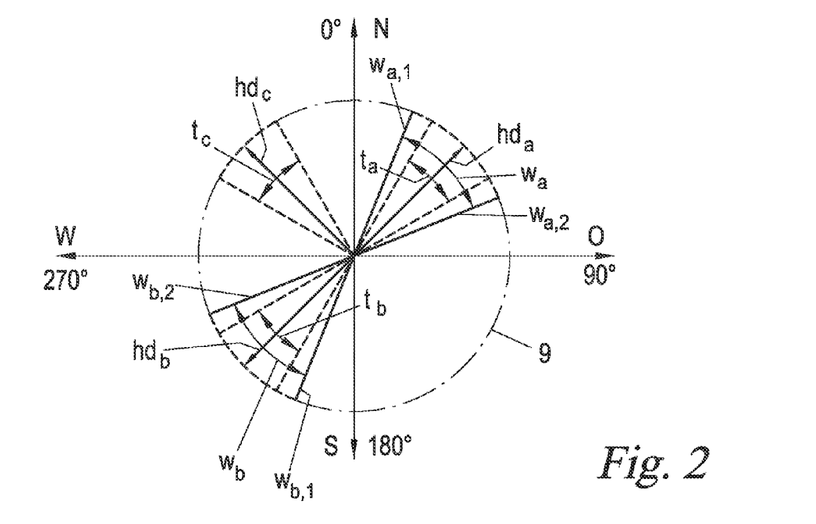
FIG. 2 shows the headings of the communication subscribers of FIG. 1, illustrated on a compass rose.

Thereafter, in step 23 the radio beacon 1 verifies that the heading hd indicated in the received heading information 20 is within predetermined boundaries ("range") w. The boundaries w define those headings hd that the onboard units 7 must have for the radio beacon 1 to carry out radio communication 6 with them. The aforementioned boundaries w can indicate one (or more) angular ranges $w_a$, $w_b$ (FIG. 2), which, in turn, are defined by upper and lower boundary angles $w_{a,1}$, $w_{a,2}$, $w_{b,1}$, $w_{b,2}$, for example. The angular ranges wa, wb are preferably selected so large that they can accommodate measuring tolerances of the onboard unit 7 in the determination of the heading hd thereof, for example tolerance ranges $t_a$ or $t_b$ of ±5° of the directions hda, hdb of the onboard units 7 of the vehicles $8_a$ or $8_b$. The angular ranges $w_a$, $w_b$ shown in FIG. 2 are defined so that they allow only radio communication 6 with onboard units 7 on roads 2, 3 and can be distinguished from each other, and block radio communication with onboard units 7 on road 4.

In some embodiments, as shown in step 23 it can additionally checked whether or not the additional condition, according to which the position p of the onboard unit 7 is present within predetermined boundaries ("area"), is met. The predetermined boundaries a for checking the position p can, for example, be the geographical outlines of a particular lane $2_1$, $2_2$, $2_3$, $3_1$, $3_2$, $3_3$, so as to be able to distinguish, for example, onboard units 7 having the same heading hd on different lanes from each other.

If the check "hd in range w?"—and additionally also the check "p in area a?" (according to some embodiments)—in step 23 produce positive results (branch "y"), in step 24 the radio beacon 1 carries out the radio communication 6 with the onboard unit 7. For this purpose, the onboard unit 7 carries out a communication step 25 that is complementary to step 24. While the radio communication 6 takes place in steps 24/25, the onboard unit 7 moves, for example progressively, from position 5 to position $p_{14}$, until the radio communication 6 is completed.

In the course of the radio communication 6, data packets are transmitted back and forth in the manner known per se between the radio beacon 1 and the onboard unit 7, wherein in addition to the onboard unit identifier OBU-ID, the data packets contain other identifiers of the onboard unit 7 and/or of the vehicle 8 thereof, information about toll parameters, the movement history thereof, applicable toll rates and the like. Based on the radio communication 6, for example toll transactions can be generated in the radio beacons 1 and transmitted to a back office of a road toll system, fees can be debited to an "electronic wallet" in the onboard unit 7, or the like.

If in step 23 of the radio beacon 1 the comparison "hd in range w?" (or optionally the comparison "p in area a?") produces negative results (branch "n"), communication step 24 is skipped (arrow 26) and no radio communication 6 takes place with the onboard unit 7. For example, as a result no radio communication 6 is carried out with onboard units 7 of vehicles $8_c$, the heading hdc of which—taking into consideration the tolerance threshold $t_c$—is not covered by one of the ranges $w_a$, $w_b$ of permissible headings, which is to say such onboard units 7 are ignored.

In some embodiments, following the radio communication 6 of step 25—but also if the same does not take place, which is to say already after transmission step 19—a waiting period or time out can be activated in the onboard unit 7, during which the onboard unit 7 does not again respond to a communication request 13'. This can prevent a scenario where one onboard unit 7 in the radio coverage range 9, and more particularly in the threshold exceeding range 18, supplies the heading hd thereof more than once to a radio beacon 1 and thus unnecessarily blocks the radio channel.

Of course, the radio beacon 1 does not necessarily have to be set up in a stationary manner or on the road, but can also be arranged on a mobile control vehicle, for example. The boundaries w, within which it communicates with onboard units 7 of passing vehicles 8, can accordingly refer to their own driving direction, which is to say a local coordinate system of the moving radio beacon 1.

Figure 6:
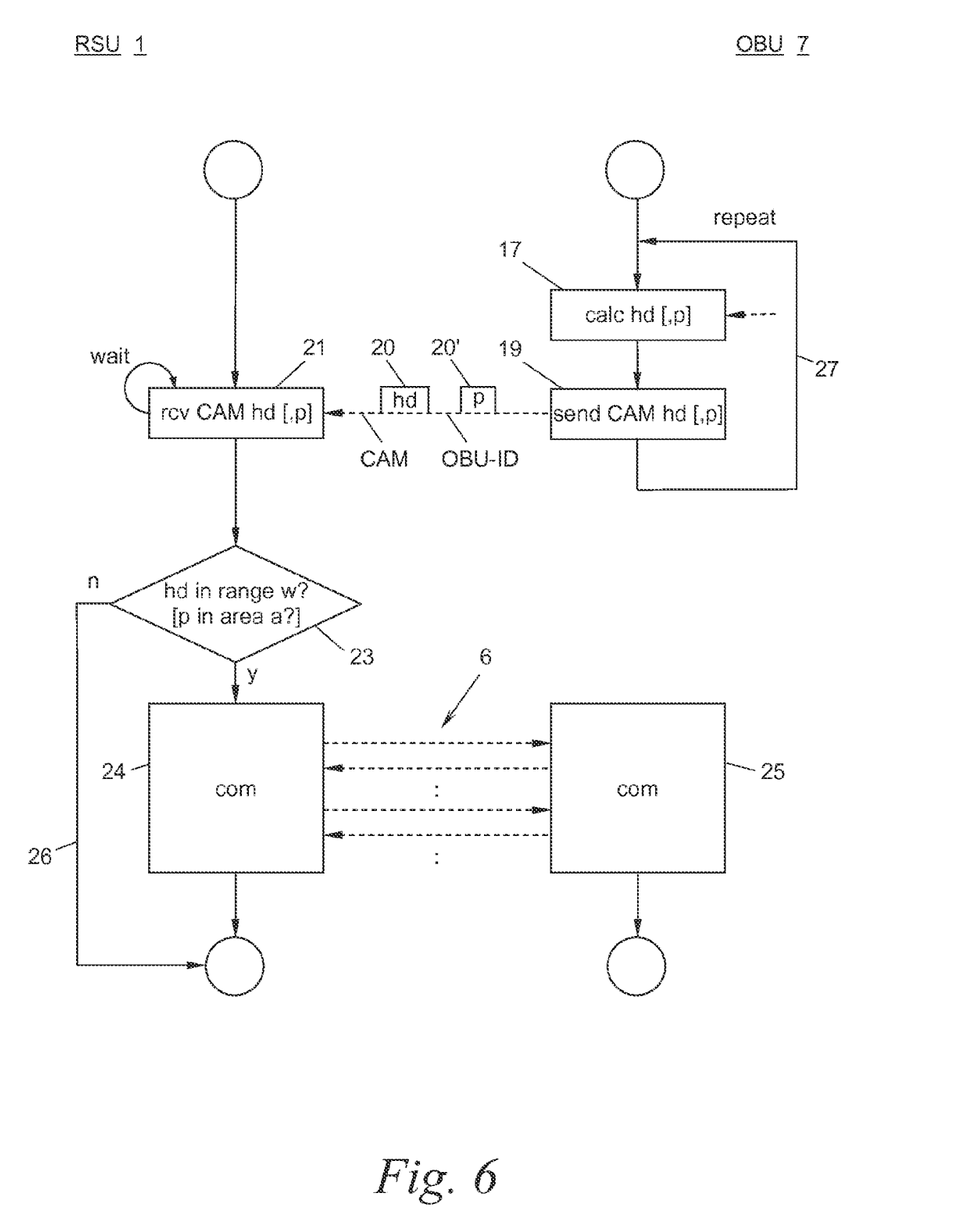
FIG. 6 is a flow chart of a second embodiment of a method.

FIG. 6 shows an alternative embodiment of the method of FIG. 5, wherein identical reference numerals denote identical elements as in FIG. 5. In the embodiment of FIG. 6, the onboard unit 7 transmits the heading information 20 therefore continually, for example periodically. Steps 17 and 19 are repeated in a loop 27, for example every 100 milliseconds. As soon as a radio beacon 1 receives (step 21) the heading information 20 of an onboard unit 7, it decides again in step 23 whether (steps 24/25) or not (arrow 26) to carry out the radio communication 6 with this onboard unit 7.

In the example shown in FIG. 6, the heading information 20 (and in some embodiments the position information 20') is transmitted in step 19, for example in form of a so-called common awareness message (CAM) according to the ETSI ITS-G5 standard. For example, such CAMs are emitted every 100 milliseconds by an ITS-G5 onboard unit 7 to provide information to surrounding motorists and can also optionally contain the heading information 20 (and optionally the position information 20') and be evaluated by a radio beacon 1 along the path of the onboard unit 7 in the manner described above, so as to selectively carry out radio communication 6 with onboard units 7 having a particular heading hd.

The invention is not limited to the shown embodiments, but encompasses all variants and modifications that are covered by the scope of the accompanying claims.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method for selective radio communication between a radio beacon and an onboard unit of a vehicle passing the radio beacon, comprising:
   in the onboard unit: determining a current heading of the onboard unit and transmitting heading information indicating the current heading to the radio beacon, the transmitting being performed by a transceiver;
   in the radio beacon: receiving the heading information and checking whether the heading indicated in the heading information is within predetermined boundaries, and if so, carrying out a radio communication with the onboard unit, wherein the predetermined boundaries are one or more angular ranges of geographical directions.

2. The method according to claim 1, wherein the onboard unit periodically transmits the heading information.

3. The method according to claim 1, wherein the onboard unit transmits the heading information when the onboard unit detects a radio beacon in the vicinity.

4. The method according to claim 3, wherein the radio beacon periodically transmits communication requests, and wherein detecting the radio beacon comprises the onboard unit receiving a communication request.

5. The method according to claim 4, wherein an omnidirectional antenna is used in the radio beacon for transmitting the communication request and carrying out the radio communication.

6. The method according to claim 1, wherein the onboard unit additionally determines a current position and transmits the current position to the radio beacon, and wherein the radio beacon additionally receives the current position and carries out the said radio communication.

7. The method according to claim 1, wherein the radio beacon determines the current position of the onboard unit and carries out the radio communication with the onboard unit only if the current position is within predetermined boundaries.

8. The method according to claim 1, wherein the onboard unit sends a unique radio identifier together with the heading information, and wherein the radio beacon uses the identifier to address the onboard unit in the radio communication.

9. The method according to claim 1, wherein the current heading of the onboard unit is determined using a satellite navigation receiver.

10. The method according to claim 4, wherein the communication request and the heading information are transmitted as messages according to the Wireless Access in a Vehicle Environment (WAVE) standard.

11. The method according to claim 1, wherein the radio beacon and the onboard unit are part of a road toll system, and the radio communication is used to impose tolls for road usage by the onboard unit.

12. A radio beacon comprising:
   a transceiver configured to perform radio communication with onboard units of passing vehicles, the transceiver configured to receive information via radio from an onboard unit indicating a current heading thereof; and
   a processor configured to check whether the current heading is within predetermined boundaries, wherein the predetermined boundaries are one or more angular ranges of geographical directions,
   wherein the radio beacon is configured to carry out a radio communication with the onboard unit only if the current heading is within the predetermined boundaries.

13. The radio beacon according to claim 12, further comprising an omnidirectional antenna configured for use in performing the radio reception and the radio communication.

14. The radio beacon according to claim 12, being further configured to determine a current position of the onboard unit and additionally configured to carry out the said radio communication with the onboard unit only if the current position is within predetermined boundaries.

15. The radio beacon according to claim 12, wherein the radio beacon is further configured to periodically transmit communication requests.

16. The radio beacon according to claim 12, wherein the radio beacon is configured to receive a radio identifier of the onboard unit and to use the radio identifier to address the radio communication to the onboard unit.

17. An onboard unit for mounting on a vehicle, comprising:
   a transceiver configured to communicate with radio beacons and to transmit current heading information to a radio beacon;

a device configured to determine the current heading information of the onboard unit, the current heading information transmitted to be used for checking whether a heading indicated in the current heading information is within predetermined boundaries, wherein the predetermined boundaries are one or more angular ranges of geographical directions;

a processor configured to detect the radio beacon based on at least one of predetermined information or information provided by another device.

18. The onboard unit according to claim 17, wherein the processor is further configured to detect the radio beacon by receiving a communication request from the radio beacon.

19. The onboard unit according to claim 17, wherein the onboard unit is configured with a unique radio identifier, and is further configured to transmit the unique radio identifier together with the current heading information.

20. The onboard unit according to claim 17, further comprising a device for determining a position of the onboard unit, the onboard unit being configured to transmit the position together with the heading information.

21. The onboard unit according to claim 17, wherein the device configured to determine the current heading information is a satellite navigation receiver.

22. The onboard unit according to claim 17, wherein the transceiver is configured to operate according to the Wireless Access in a Vehicle Environment (WAVE) standard and transmits the heading information following a Vehicle Service Table (VST) message.

* * * * *